United States Patent
Moreno Egea et al.

(10) Patent No.: US 9,309,484 B2
(45) Date of Patent: Apr. 12, 2016

(54) PROCESS FOR REDUCING POLLUTANTS IN FATS AND OILS AND THEIR DERIVATIVES

(75) Inventors: Fernando Moreno Egea, Mallen Zaragoza (ES); Laura Gil Puig, Mallen Zaragoza (ES)

(73) Assignee: Soluciones Extractivas Alimentarias, S.L., Mallen Zaragoza (ES)

( * ) Notice: Subject to any disclaimer, the term of this patent is extended or adjusted under 35 U.S.C. 154(b) by 0 days.

(21) Appl. No.: 14/232,658

(22) PCT Filed: Oct. 10, 2011

(86) PCT No.: PCT/EP2011/067634
§ 371 (c)(1),
(2), (4) Date: Mar. 31, 2014

(87) PCT Pub. No.: WO2013/007315
PCT Pub. Date: Jan. 17, 2013

(65) Prior Publication Data
US 2014/0275594 A1    Sep. 18, 2014

(30) Foreign Application Priority Data
Jul. 14, 2011 (ES) .................................. 201131203

(51) Int. Cl.
*C11B 3/00* (2006.01)
*C11B 3/12* (2006.01)
*B01D 15/40* (2006.01)
*C11B 3/10* (2006.01)

(52) U.S. Cl.
CPC . *C11B 3/12* (2013.01); *B01D 15/40* (2013.01); *C11B 3/001* (2013.01); *C11B 3/006* (2013.01); *C11B 3/10* (2013.01)

(58) Field of Classification Search
CPC ............ C11B 3/14; C11B 3/001; C11B 3/06; C11B 3/16; C11C 1/10
USPC ...................................................... 554/175
See application file for complete search history.

(56) References Cited

U.S. PATENT DOCUMENTS

| | | | | |
|---|---|---|---|---|
| 5,128,162 A | * | 7/1992 | Wrezel et al. ................. | 426/417 |
| 5,561,066 A | * | 10/1996 | Sinha ............................. | 436/73 |
| 7,678,930 B2 | * | 3/2010 | Sondbo et al. .................. | 554/12 |
| 7,718,698 B2 | * | 5/2010 | Breivik et al. ................. | 514/558 |
| 2008/0234375 A1 | | 9/2008 | Breivik et al. | |

FOREIGN PATENT DOCUMENTS

| | | |
|---|---|---|
| ES | 2339238 T3 | 5/2012 |
| WO | 99/64547 A1 | 12/1999 |
| WO | WO 9964547 A1 * | 12/1999 |
| WO | 0052118 | 8/2000 |

OTHER PUBLICATIONS

Nieto, L M., et al., "Elimination of Pesticide Residues from Virgin Olive Oil by Ultraviolet Light: Preliminary Results", Journal of Hazardous Materials, 2009, 555-559, vol. 168, Elsevier B.V.
El Bakouri, H., et al., "Adsorptive Features of Acid-Treated Olive Stones for Drin Pesticides: Equilibrium, Kinetic and Thermodynamic Modeling Studies", Bioresource Technology, 2009, 4147-4155, vol. 100, Elsevier B.V.
Fuentes, E., et al., "Microwave-Assisted Extraction at Atmospheric Pressure Coupled to Different Clean-Up Methods for the Determination of Organophosphorus Pesticides in Olive and Avocado Oil", Journal of Chromatography A, 2009, 8859-8866, vol. 1216, Elsevier B.V.
El Bakouri, H., et al., "Natural Attenuation of Pesticide Water Contamination by Using Ecological Adsorbents: Application for Chlorinated Pesticdes Included in European Water Framework Directive", Journal of Hydrology, 2009, 175-181, vol. 364, Elsevier B.V.
Kawashima, A., et al., "Removal of Dioxins and Dioxin-like PCBs from Fish Oil by Countercurrent Supercritical CO2 Extraction and Activated Carbon Treatment", Chemosphere, 2009, 788-794, vol. 75, Elsevier B.V.
Castelo-Grande, T., et al., "Removal of Pesticides from Soil by Supercritical Extraction—A Preliminary Study", 2005, 167-171, vol. 111, Elsevier B.V.
Quan, C., et al., "Supercritical Fluid Extraction and Clean-Up of Organochlorine Pesticides in Ginseng", The Journal of Supercritical Fluids, 2004, 149-157, vol. 31, Elsevier B.V.
Mills, A., et al., Rapic Isolation of Polycholorinated Biphenyls from Milk by a Combination of Supercritical-Fluid Extraction and Supercritial-Fluid Chromatograpy, Journal of Chromatography, 1993, 409-418, vol. 643, Elsevier B.V.

* cited by examiner

*Primary Examiner* — Deborah D Carr
(74) *Attorney, Agent, or Firm* — McNees Wallace & Nurick LLC

(57) ABSTRACT

The present invention describes a process to reduce or eliminate at least one pollutant in a starting material, said starting material is at least one of an oil, a fat, its derivatives and mixtures thereof, of animal, krill, algae or microbial origin or biofuel, being totally or partially esterified or transesterified, or of vegetable origin, being raw, esterified or transesterified, to which optionally it is added a fluid, said fluid is at least one of an ester, a partial glyceride, a monoglyceride, a diglyceride and mixtures thereof, subjecting the starting material to at least one stage of extraction or chromatography or distillation. The process of the invention provides a product suitable to be used in food, pharmacy, cosmetic and as a dietary supplement.

20 Claims, No Drawings

PROCESS FOR REDUCING POLLUTANTS IN FATS AND OILS AND THEIR DERIVATIVES

TECHNICAL FIELD

The present invention relates to the field of purification of oils, fats and its derivatives. In particular it relates to a process for reducing the amount of environmental pollutants, agricultural residues and cholesterol in oils or fats and its derivatives, of animal or vegetable origin, by means of chromatography, extraction or distillation. Likewise, the present invention relates to the products obtained, suitable for being used in food, cosmetics, pharmacy and as a dietary supplement due to their reduced level of environmental pollutants.

STATE OF THE ART

Persistent organic pollutants, (internationally known by its acronym in English, POPs) are chemical substances that persist in the environment, accumulate through the food chain and pose a risk to human health and to the environment. The evidence of long-range transport of these substances to regions where they have never been used or produced is ostensible, and adding to this their harmful consequences to the environment, several measures have been taken to reduce and eliminate the emission of these substances.

Most persistent organic pollutants are highly fat soluble and as such they are integrated into the fatty tissues of microorganisms or small-sized organisms such as algae, plankton and krill, as well as into the skin of fruits and seeds and successive links of the food chain. Thus, persistent organic pollutants pose a serious problem in relation with animal and vegetable oils, due to their accumulation in fatty cells.

Identified persistent organic pollutants are industrial pollutants such as dioxins (PCDDs), furans (PCDFs), polychlorinated biphenyls (PCBs), brominated flame retardants (PBDEs, HBCD, PBB) and pesticides (such as DDT, toxaphene, chlorpyrifos, phenylphenol, bromopropylate, among others).

Meanwhile, agricultural residues and in particular organophosphorus pesticides are added to the cultivation and post-harvest processes of vegetables and they accumulate in their fatty parts due to its lipophilic nature, being highly soluble in oils derived from vegetable matrices obtained by means of extraction. Also, during the subsequent concentration processes of target compounds of these oils (eg, its aromatic compounds) or the reduction of volatile and highly labile and undesirable olfactory components, agricultural residues accumulate and concentrate as well. Meanwhile, cholesterol is a sterol found in blood plasma and body tissues of vertebrates, animal fats are rich in cholesterol. Nowadays, the causal role of cholesterol found in low density lipoproteins (LDL) in arteriosclerosis pathogenesis is widely accepted. As demonstrated by Framingham in 1948, a sustained presence of high levels of LDL type cholesterol above recommended levels, increases the risk of cardiovascular episodes.

Currently accepted concentration of cholesterol in the blood plasma among healthy individuals is less than 240 mg/dl for the total amount of cholesterol, less than 190 mg/dl for type LDL cholesterol and less than 60 mg/dl for HDL (High density lipoproteins) type cholesterol.

In the last decades, scientific research has focused on the impact of a group of persistent organic pollutants and the majority of regulatory agencies, among which are included the Spanish Food Safety Agency (AESAN), the European Food Safety Authority (EFSA), the Department of Agriculture of the United States (USDA) and the United States Food and Drug Administration (FDA), have imposed limits to their presence.

The most valuable fractions of long chain polyunsaturated fatty acids (known by its English acronym, LC-PUFAs) of omega-3 group, eicosapentaenoic acid (EPA) and docosahexaenoic acid (DHA), are found abundantly in marine oils. It is also possible to find Omega 3 short chain fatty acids in vegetables, such as alfa-linolenic acid. Another Omega 6 group contains polyunsaturated fatty acids of vegetable origin, such as linoleic acid. The demand for high-quality and purity oils of animal origin, with high concentrations of EPA and DHA fatty acids, and vegetable oils concentrated in its aromatic components, containing a reduced amount or no pollutants is increasing at a remarkable pace.

The previously exposed factors urge the sector of concentrated oils and extracts to use methods and processes of refining, purification, separation and concentration of fractions, such as molecular distillation, extraction, fluid extraction and supercritical fluid extraction and chromatography, fluid chromatography and supercritical fluid chromatography that allows them to obtain oils of vegetable and animal origin with a high concentration of EPA and DHA fatty acids. On the other hand, it must be taken into account that the concentration and purification techniques mentioned above also have the potential to concentrate, along with the desired fatty acids, environmental pollutants and cholesterol that may be present in oils and fats used as starting material.

From scientific literature it is known that supercritical $CO_2$ extraction technology combined with an activated carbon treatment can be used to remove dioxins and PCBs from fish oils (A. Kawashima, S. Watanabe, R. Iwakiri y K. Honda, Removal of dioxins and dioxin-like PCBs from fish oil by countercurrent supercritical CO2 extraction and activated carbon treatment, 25 Chemosphere, n° 75, págs. 788-794; 2009). This study is limited to the reduction of contaminants in fish oil, while the invention described in this patent is able to purify any type of oil or fat, regardless of its origin and whether it is totally or partially esterified or transesterified. U.S. Pat. No. 7,718,698 B2 describes a process to reduce environmental pollutants found in oils or fats, adding to them a volatile working fluid (which may be a fatty acid ester, a fatty acid amide, a free fatty acid or hydrocarbon) and subjecting the mixture to an extraction process that separates environmental pollutants together with the volatile fluid from the oil or fat. The technologies used to carry out the extraction process are short-path distillation, evaporation, short path evaporation, distillation, thin film evaporation and molecular distillation. A limitation of this technologies is the necessity to work at high capacity, handling large volumes of raw material, and for this reason they are not suitable to purify oils or fats already concentrated in fatty acids having been previously totally or partially esterified, precisely because all of this technologies are based in the high solubility of pollutants in ethylesters, so that most of them are dragged along with the ethylester distillated. One of the main differences between both inventions is that in the process described in U.S. Pat. No. 7,718,698 just crude oils are purified while the process described in the present invention allows to purify fatty acid concentrates in the form of ethyl ester or transesterified triglyceride. Therefore, it is usual to apply a pre-sterification stage before concentrating the oils or fats. Given this array, when subjecting the esterified oil to a concentration process in its Omega-3 polyunsaturated fatty acids, is likely to concentrate also the environmental pollutants and cholesterol that cannot be eliminated in large amounts using conventional techniques.

U.S. Pat. No. 7,678,930 B2 describes a process for reducing the amount of cholesterol in marine oils using a volatile working fluid. As in the aforementioned patent, it describes several technologies suitable to carry out the separation process, such as molecular distillation, short path distillation and thin-film evaporation. In the same sense, this process is suitable for purifying crude oils and fats, with a low concentration of polyunsaturated fatty acids, although it may not be suitable to purify esterified oils or fats previously concentrated. On the other hand, given the low return of processing small volumes of raw material, is optimal for handling large amounts of fats and oils.

The techniques that focus on the reduction of agricultural residues are basically based on the processing of solid blendings, or in their use in contaminated soils to prevent water pollution, either in solid or liquid vegetable mixtures. In the last situation, several techniques have been studied, although all of them consider the storage of oil in cartridges to be processed. Agricultural residues are reduced by means of absorption (H. El Bakouri, J. Morillo, J. Usero y A. Ouassini, Natural attenuation of pesticide water contamination by using ecological adsorbents: Application for chlorinated pesticides included in European water Framework Directive, Journal of Hydrology, Volume 364, Issues 1-2, 15 Jan. 2009, Págs. 175-181 y H. El Bakouri, J. Usero, J. Morillo y A. Ouassini, Adsorptive features of acid-treated olive stones for drin pesticides: Equilibrium, kinetic and thermodynamic modeling studies, Bioresource Technology, Volume 100, Issue 18, Sep. 2009, Págs. 4147-4155) or they are reduced by means of liquid extraction using solvents with toxic liquids such as hexane and acetonitrile (E. Fuentes, M. E. Báez y J. Diaz, Microwave—Assisted extraction at atmospheric pressure coupled to different clean-up methods for the determination of organophosphorus pesticides in olive and avocado oil, Journal of Chromatography A, Volume 1216, Issue 51, 18 Dec. 2009, Pags. 8859-8866). Pesticides can also be reduced by means of supercritical solid extraction (C. Quan, S. Li, S. Tian, H. Xu, A. Li y L. Gu, Supercritical fluid extraction and clean-up of organochloride pesticides in ginseng, Journal of Chromatography A, 818, 1, 1998, 138-143) or by using alternative technologies such as ultraviolet light (L. Martínez, G. Hodaifa y M. S. Casanova, Elimination of pesticide residues from virgin olive oil by ultraviolet light, Journal of Hazardous Materials, 168, 1, 2009, 555-559). Scientific literature describes the use of supercritical extraction with carbon dioxide for decontamination of soil containing pesticides (T. Castelo-Grande, P. A. Augusto y D. Barbosa: Removal of pesticides from soil by supercritical extraction—a preliminary study; Chemical Engineering Journal, n° 111, pags. 167-171; 2005). The process described is used in order to purify solid mixtures, however, it may not be appropriate to purify liquid mixtures and, therefore, it may not provide products suitable for food and pharmaceutical industries and as dietary supplements. Purification of oils, fats and its derivatives at high pressure by means of supercritical fluid technology is a clean option with low operating temperatures and that does not leave residues of solvent.

As explained above, the need to provide a process for purifying oils and fats that at least partially overcomes the aforementioned disadvantages remains. The procedures proposed in this invention operates with higher volumes and ongoing work processes, and provides products free of pollutants and with no traces of solvents, which make them suitable for the sectors mentioned above. Besides, the proposed process is suitable for purifying oils or fats concentrated in polyunsaturated fatty acids or in their aromatic compounds, previously fully or partially esterified.

DESCRIPTION OF THE INVENTION

According to one aspect of the invention, it relates to a process, in advance the process of the invention. This process reduces or eliminates a pollutant in a starting material, optionally adding a fluid to the starting material, such process comprising at least one step of chromatography or extraction or distillation, and combinations thereof and optionally a treatment stage with active carbon. The process of the invention provides a product suitable to be uses in food, cosmetics, pharmacy and as dietary supplement.

According to the invention, the term persistent organic pollutant refers to chemicals substances that persist in the environment, accumulate through the food chain and pose a risk to human health and to the environment, persistent organic pollutants already identified are industrial residues, such as dioxins (PCDDs), furans (PCFs), polychlorinated biphenyls (PCBs) and brominated flame retardants (PBDEs, HBCD, PBB), among others.

The term agricultural residue refers to substances added to vegetables in cultivation and post-harvest processes, which include organophosphate pesticides, DDT, toxaphene, chlorpyrifos, and bromopropylate phenylphenol, among others.

According to the invention, the term cholesterol refers to a sterol found in blood plasma and body tissues of vertebrates, thus animal fats are rich in cholesterol, and it is considered a pollutant in connection with the nutritional value of a starting material of marine origin used as the starting material of the present invention. According to the invention, the term starting material refers to a compound selected from the group consisting of oils, fats, its derivatives and mixtures thereof, either of animal, krill, algae or microbial origin or biofuels, being totally or partially esterified chemically or enzymatically or transesterified; or of vegetable origin from natural matrices, being obtained by hot or cold extraction techniques, and appearing under raw form, or total or partially esterified or transesterified chemically or enzymatically. According to the invention, the term derivative in relation with oil and fat refers to an oil or fat concentrated in polyunsaturated fatty acids, or in its aromatic compounds.

According to the invention the term fluid refers to a fluid that is optionally added to the starting material in the process of the invention to favor in some cases the solubility of the pollutants with that fraction and to improve the reduction of pollutants of the totally or partially sterified fraction, and it is selected from the group consisting of partial glycerides, monoglycerides and diglycerides of fatty acids from 10 to 24 carbon atom chains and mixtures thereof, of animal, vegetable, krill, algae or microbial origin or biofuel.

According to the invention, the term mobile phase refers to a fluid used in the chromatographic technique, which is selected from the group consisting of carbon dioxide, hydrocarbons, alcohols and mixtures thereof.

According to the invention, the term modifier refers to a fluid that is optionally added to the mobile phase during the chromatography step or to the extraction solvent during the extraction phase which acts as a modifier of its polarity and solubility, to improve the extraction of the components of interest. This fluid is selected from the group consisting of alcohols, hydrocarbons and mixtures thereof.

In a particular embodiment of the invention, the process of the invention comprises a step of distillation.

In a particular embodiment of the invention the distillation step is at least one of a short path evaporation, thin-film evaporation, thin film distillation, molecular distillation or short path distillation.

In a preferred embodiment of the invention, said distillation is a molecular distillation. Further, in a most preferred embodiment, the distillation is a short path distillation.

In this embodiment the short path distillation plant comprises a supply tank, an evaporator, a vacuum pump, a degasser, rollers, heat exchangers, a condenser, a thermal conditioned tank and a continuous and closed circuit.

According to this embodiment, the starting material is stored in the supply tank, where it is preheated to a temperature between 50° C. to 60° C. in order to be prepared for working conditions. Under these conditions it is pumped to a determined and controlled flow, so that the flow rate into the evaporator is regulated. The starting material input into the evaporator is established at a rate comprised between 20 to 150 Kg/h per m$^2$ of total evaporation surface of the evaporator. Previously, the starting material goes through a degasser, where it is preheated by means of a heat exchanger at a temperature comprised between 60° C. and 100° C., the composition of the starting material determines the temperature. The evaporation of highly volatile components of the starting material, such as free fatty acids and amino compounds, among others, takes place in the degasser and those components are collected in a tank. Inside the degasser the pressure is comprised between 200 Pa (2 mbar) to 150 Pa (15 mbar). The remaining compounds of the starting material not distilled in the degasser enter the evaporator, whose interior is maintained at a pressure between 10 Pa ($1.10^{-1}$ mbar) to 0.1 Pa ($1.10^{-3}$ mbar) and a temperature between 110° C. to 195° C. Temperature and pressure, along with other parameters such as the flow rate of the starting material, the composition of the starting material and the natural solubility of the components of the starting material together are the parameters that determine the necessary conditions to carry out the targeted process. The degassed starting material is introduced into the evaporator and it slides down the walls of the evaporator, which are maintained at a high temperature having been previously determined. The starting material molecules whose boiling point is below the prevailing conditions inside the evaporator are evaporated. In order to facilitate the evaporation inside the evaporator, it is provided with rollers that extend uniformly the degassed starting material creating a thin layer in contact with the evaporator wall that slides down the wall. The evaporated components form the distillate fraction that flows toward the center of the evaporator in gaseous state. The distillation plant contains an internal condenser, which is located in the central part of the evaporator, inside it. The internal condenser consists of a coil through which circulates cold water; the distillate condenses when it is in contact with the condenser. The residue (meaning not evaporated components) is collected in a thermal conditioned tank where the temperature ranges between room temperature to 70° C. The distillate, consisting of the evaporated and condensed compounds is collected in another tank.

In a particular embodiment, the process of the invention comprises a chromatography step.

In a preferred embodiment, the process of the invention comprises a fluid chromatography step.

Further, in a most preferred embodiment, the process of the invention comprises a supercritical fluid chromatography step.

In this case, the supercritical fluid chromatography plant comprises a supply tank, pumps, a mobile phase tank, a continuous and closed circuit, a chromatography column, atmospheric tanks and separators.

In this embodiment, the starting material is introduced into the supply tank which is driven into the chromatography column through a drive pump. Thus, the starting material flows to the chromatography column under suitable pressure and temperature conditions to perform the separation process. In this particular embodiment the mobile phase is at least one of carbon dioxide, hydrocarbons, alcohols and mixtures thereof. The mobile phase is stored in a liquid-gas balanced state. The mobile phase is liquefied and pumped into the chromatography column at a working pressure. Then it is heated to supercritical conditions and introduced into the chromatography column. Once the mobile phase and the starting material are introduced into the column the compounds of the starting material are fractionated by their interaction with the stationary phase. The different fractions exit the column dissolved in the mobile phase. A separator is inserted to the chromatography column to separate the resulting fractions and the mobile phase due to the decompression of the system. Subsequently, the resulting fractions are introduced in atmospheric tanks and the mobile phase already decompressed returns to the mobile phase tank.

In a particular embodiment of the invention, the ratio of the mobile phase/starting material is about 225 to 950. In a preferred embodiment, the ratio of the mobile phase/starting material is about 300 to 700.

In a particular embodiment of the invention, the chromatography process is carried out at temperatures in the interval of 32° C.-70° C. In a preferred embodiment, the chromatography process is carried out at temperatures in the interval of 40° C.-65° C.

In a particular embodiment, the process of the invention is carried out at pressures in the interval of 7.5 MPa (75 bar) to 30 MPa (300 bar). In a preferred embodiment, the chromatography process is carried out at pressures in the interval of 8.9 MPa (89 bar) to 12.1 MPa (121 bar).

In a particular embodiment of the invention, the mobile phase is carbon dioxide.

In a preferred embodiment of the invention, the mobile phase is carbon dioxide under supercritical conditions.

In a particular embodiment of the invention, it is optionally added to the mobile phase a modifier selected from the group consisting of hydrocarbons, alcohols and mixtures thereof.

In a preferred embodiment of the invention, the chromatography step is carried out in normal phase.

In a particular embodiment of the invention, the chromatography step is carried out in reverse phase.

In a particular embodiment, the process of the invention comprises an extraction step.

In a preferred embodiment, the process of the invention comprises a step of fluid extraction.

In a more preferred embodiment, the process of the invention comprises a step of supercritical fluid extraction.

In this case, the extraction plant comprises a supply tank, pumps, a solvent tank, a continuous and closed circuit, an extraction column, atmospheric tanks and separators.

According to this embodiment, the process starts loading the starting material to be processed in the supply tank. The temperature inside this tank is maintained in the interval of 20° C. to 40° C. in order to preheat the starting material so that it is ready for the extraction process without applying high temperatures that may degrade it. The supply tank is heated by means of water exchange in coils that are in contact with the tank and surround it. The extraction solvent is stored in the solvent tank and it is injected in liquid form into the continuous and close circuit through a pump that pressurizes until the solvent of extraction reaches the working pressure. Subsequently, the extraction solvent is heated to the working temperature. The extraction solvent enters the extraction column from its bottom, ascends and exits the extraction column from the top. Once the extraction solvent exits the column, it is decompressed. The extraction solvent is decompressed by controlled expansion to avoid sudden cooling and condensation, and it is then returned to the solvent tank. The loading of extraction solvent into circuit is continuous, which increases the productivity. The extraction solvent is continually conditioned to the working conditions. Further, the starting material is injected through a discharge pump to the column from its top at pressures of at least 1 MPa (10 bar) higher than the pressure inside the column to facilitate the entry of the starting material into the column. Inside the column the starting material descends by gravity. The interior of the column consists of structured filler that regulates the descent of the starting material at a slower pace. On its descending way through the column, the starting material collides with the extraction solvent that is continuously ascending through the column. Under these conditions, the extraction solvent is able to dissolve the components of interest of the starting material (in this case, the pollutants are separated by extraction of other components, concentrating these compounds in the removed fraction). The extraction solvent ascends and exits through the top of the column dragging the dissolved components of the starting material. It is possible to change the solubility of the extraction solvent by varying the temperature, pressure and the ratio extraction solvent/starting material. In a posterior decompression stage the temperature and pressure are modified in the separators, so that the extraction solvent is no longer able to dissolve the compounds of interest and the extraction solvent is completely separated from the removed fraction. The extraction solvent flows through the system to the solvent tank. The fraction not dissolved by the extraction solvent continues descending through the column and is discharged through the lower part of the column. This fraction is decompressed in stages and collected in atmospheric tanks.

In a particular embodiment of the invention, the ratio of the extraction solvent/starting material is established between 10 to 75.

In a preferred embodiment of the invention, the ratio of the extraction solvent to the starting material is about 20 to 55.

In a particular embodiment, the process of the invention is carried out at temperatures in the interval of 32° to 72° C.

In a preferred embodiment, the process of the invention is carried out at temperatures in the interval of 40° C. to 65° C.

In a particular embodiment, the process of the invention is carried out at pressures in the interval of 7.5 MPa (75 bar) to 30 MPa (300 bar).

In a preferred embodiment, the process of the invention is carried out at pressures in the interval of 8.9 MPa (89 bar) to 12.1 MPa (121 bar).

In a particular embodiment of the invention, the extraction solvent is carbon dioxide.

In a preferred embodiment of the invention, the extraction solvent is supercritical carbon dioxide.

In a particular embodiment of the invention, it is optionally added to the extraction solvent a modifier selected from the group consisting of hydrocarbons, alcohols and mixtures thereof.

In a particular embodiment of the invention, the decompression is performed in several stages.

In a preferred embodiment of the invention, the decompression is performed in two stages.

In a preferred embodiment of the invention, the decompression is performed in one stage.

The process of the invention reduces or eliminates at least one pollutant of the starting material.

In a particular embodiment, the process of the invention reduces the content of cholesterol in the starting material to less than 25 mg/g, preferably less than 6 mg/g.

In a particular embodiment, the process of the invention reduces PCBs in the starting material, measured as total concentration of PCBs, to less than 150 µg/kg, preferably to less than 25 µg/kg.

In another particular embodiment, the process of the invention reduces dioxins in the starting material to a value equal or inferior than 23 pg/g, preferably to a value equal or inferior than 8 pg/g.

In a particular embodiment, the process of the invention reduces agricultural pesticides in the starting material to a value equal or inferior than 100 ppm, preferably to a value equal or inferior than 20 ppm.

In a particular embodiment of the invention, it is added to the starting material a fluid of marine origin.

It should be taken into account that within the scope of the invention as it is defined in the following claims several modifications may be practiced in the aforementioned embodiments.

EXAMPLES

The invention will now be illustrated by the following non-limiting examples. These examples are set forth merely for illustrative purposes and many other variations of the process may be possible.

Example 1

Reduction of Cholesterol in Partially Esterified Fish Oil by Means of Supercritical Extraction A refined fish oil, totally or partially esterified, using 99.5 alcoholic strength absolute ethanol and 90% purity potassium hydroxide (KOH) in scales, undergoes a process of concentration by means of molecular distillation and supercritical extraction to remove the fraction of saturated and monounsaturated fatty acids. The esterified and concentrated in polyunsaturated fatty acids oil contains 43.99 mg/g of cholesterol. The oil is subjected to a supercritical extraction step, using carbon dioxide as a solvent agent, the process is carried out at an extraction temperature of 40° C., at an extraction pressure of 10.4 MPa (104 bar) and the ratio solvent of extraction/starting material is 50. Results are shown in the following table:

TABLE 1

| Cholesterol in esterified and concentrated fish oil | | |
|---|---|---|
| | Before process | After process |
| Cholesterol | 43.99 mg/g | 4.4 mg/g |

As shown in Table 1, the process of the invention allows reducing by only one supercritical extraction step 90% of the content of cholesterol.

To person a well versed in the subject, it is obvious that this process can be used with the same effectiveness with other oils of animal or vegetable origin to reduce cholesterol with the same effect.

Additionally, the resulting oil is subjected to a second supercritical extraction step using carbon dioxide as solvent of extraction, the process is carried out at a temperature of 40°

C., a pressure of 9.3 MPa (93 bar) and the ratio solvent of extraction/starting material is 44.6.

TABLE 2

Cholesterol in esterified and concentrated fish oil

|  | Before process | After process |
|---|---|---|
| Cholesterol | 4.4 mg/g | <0.1 mg/g |

As shown in Table 2, the process of the invention allows reducing the cholesterol content below the analytical detection limit.

Example 2

Reduction of Cholesterol in Fully Esterified Fish Oil by Means of Supercritical Extraction A refined fish oil, totally or partially esterified, using 99.5 alcoholic strength absolute ethanol and 90% purity potassium hydroxide (KOH) in scales, undergoes a process of concentration by means of molecular distillation and supercritical extraction to remove the fraction of saturated and monounsaturated fatty acids. The esterified and concentrated in polyunsaturated fatty acids oil contains 56.7 mg/g of cholesterol. A mixture of partial glycerides, monoglycerides and diglycerides are added to the oil, until their content in relation with the starting material is 20%. The resulting mixture is subjected to a supercritical extraction step, using carbon dioxide as solvent of extraction, the process is carried out at a temperature of extraction of 40° C., at a pressure of extraction of 10.4 MPa (104 bar) and the ratio solvent of extraction/starting material is 50. Results are shown in the following table:

TABLE 3

Cholesterol in esterified and concentrated fish oil

|  | Before process | After process |
|---|---|---|
| Cholesterol | 56.7 mg/g | 4.9 mg/g |

As shown in Table 3, the process of the invention allows reducing the cholesterol content by 92% in only one supercritical extraction step.

Example 3

Reduction of Cholesterol in an Esterified Fish Oil by Means of Molecular Distillation A refined fish oil, totally or partially esterified, using 99.5 alcoholic strength absolute ethanol and 90% purity potassium hydroxide (KOH) in scales, undergoes a process of concentration by means of molecular distillation and supercritical extraction to remove the fraction of saturated and monounsaturated fatty acids. The esterified and concentrated in polyunsaturated fatty acids oil contains 43.99 mg/g of cholesterol. A mixture of partial glycerides, monoglycerides and diglycerides are added to the oil, until their content in the starting material is 39%. The resulting mixture is subjected to a short path distillation step, the process is carried out at a temperature of 145° C., at a pressure of 5 Pa (0.05 mbar), the starting material input speed is 20 kg/h and the heating surface is 1 m². Results are shown in the following table:

TABLE 4

Cholesterol in esterified and concentrated fish oil

|  | Before the process | After the process |
|---|---|---|
| Cholesterol | 44.6 mg/g | 3.21 mg/g |

As shown in Table 4, the process of the invention allows reducing the cholesterol content by 93% in only one molecular disillation step.

To person a well versed in the subject, it is obvious that this process can be used with equal effectiveness in other oils of animal or vegetable origin to reduce cholesterol with the same effect.

Example 4

Reduction of Polychlorinated Biphenyls (PCBs) in Esterified Fish Oil by Means of Supercritical Extraction Unrefined fish oil is totally esterified using 99.5 alcoholic strength absolute ethanol and 90% purity potassium hydroxide (KOH) in scales. The final concentration of ethyl ester is 94%. The initial concentration of polychlorinated biphenyls (PCBs), measured as the total concentration of polychlorinated biphenyls (PCBs), is 39.1 mg/kg.

The oil is subjected to a supercritical extraction step, using carbon dioxide as a solvent agent, the process is carried out at a temperature of extraction of 40° C., at a pressure of extraction of 10.03 MPa (100.3 bar) and the ratio solvent of extraction/starting material is 44.3. A sample of the oil before and after the reduction of polychlorinated biphenyls (PCBs) was analyzed. Results are shown in the following table:

TABLE 5

Polychlorinated Biphenyls (PCBs) in esterified fish oil

|  | Before the process | After the process |
|---|---|---|
| CB-138 | 12.3 µg/Kg | <5 µg/Kg |
| CB-153 | 16.9 µg/Kg | <5 µg/Kg |
| CB-180 | 9.9 µg/Kg | <5 µg/Kg |
| TOTAL PCB's | 39.1 µg/Kg | <5 µg/Kg |

As shown in Table 5, the process of the invention allows reducing the content of polychlorinated biphenils (PCBs) below the analytical detection limit in the starting material in only one supercritical extraction step.

To person a well versed in the subject, it is obvious that this process can be used with the same effectiveness with other oils of animal or vegetable origin to reduce cholesterol with the same effect.

Example 5

Reduction of Polychlorinated Biphenyls (PCBs) in Esterified Fish Oil by Means of Supercritical Extraction A refined fish oil, totally esterified using 99.5 alcoholic strength ethanol and 90% in scales potassium hydroxide (KOH), undergoes a process of concentration by means of molecular distillation and supercritical extraction to remove the fraction of saturated and monounsaturated fatty acids. A mixture of partial glycerides, monoglycerides and diglycerides is added to the oil, until their content in the starting material is 9%.

A certain amount of several polychlorinated biphenyls (PCBs) is added to oil so that the starting concentration before the treatment, given as total concentration of polychlorinated biphenyls (PCBs) is 379.6 mg/kg.

The oil is subjected to a supercritical extraction step, using carbon dioxide as solvent agent, the process is carried out at a temperature of extraction of 50° C., at a pressure of extraction of 10.23 MPa (102.3 bar) and the ratio solvent of extraction/starting material is 35. A sample of the oil before and after the reduction of polychlorinated biphenyls (PCBs) was analyzed. Results are shown in the following table:

TABLE 6

Polychlorinated Biphenyls (PCBs) in esterified fish oil

|  | Before the process | After the process |
| --- | --- | --- |
| CB-28 | 89.7 µg/Kg | 33.3 µg/Kg |
| CB-52 | 60.9 µg/Kg | 40.3 µg/Kg |
| CB-101 | 88.5 µg/Kg | 24.4 µg/Kg |
| CB-153 | 55.8 µg/Kg | <5 µg/Kg |
| CB-170 | 84.7 µg/Kg | <5 µg/Kg |
| TOTAL PCB's | 379.6 µg/Kg | 98.0 µg/Kg |

As shown in Table 6, the process of the invention allows reducing the content of polychlorinated biphenyls (PCBs) by 74% in the starting material in only one supercritical extraction step.

Additionally, the resulting oil is subjected to a second supercritical extraction step using carbon dioxide as solvent of extraction, the process is carried out at a temperature of 40° C., a pressure of 9.63 MPa and the ratio solvent of extraction/starting material is 43. A sample of the oil before and after the reduction of polychlorinated biphenyls (PCBs) was analyzed. Results are shown in the following table:

TABLE 7

Polychlorinated Biphenyls (PCBs) in esterified fish oil

|  | Before the process | After the process |
| --- | --- | --- |
| CB-28 | 33.3 µg/Kg | <5 µg/Kg |
| CB-52 | 40.3 µg/Kg | <5 µg/Kg |
| CB-101 | 24.4 µg/Kg | <5 µg/Kg |
| CB-153 | <5 µg/Kg | <5 µg/Kg |
| CB-170 | <5 µg/Kg | <5 µg/Kg |
| TOTAL PCB's | 98.0 µg/Kg | <5 µg/Kg |

To person a well versed in the subject, it is obvious that this process can be used with the same effectiveness with other oils of animal or vegetable origin to reduce PCBs with the same effect.

Example 6

Reduction of Agricultural Residues (AR's) in Lemon Oil by Means of Supercritical Extraction Lemon essential oil, obtained from lemon peel by means of cold extraction, is subjected to a process of concentration in its aromatic compounds by means of supercritical extraction.

The oil is subjected to a process for decreasing the amount of agricultural residues by means of supercritical extraction using carbon dioxide as solvent of extraction, the process is carried out at a temperature of extraction of 64.5° C., a pressure of extraction of 10.44 MPa (104.4 bar) and the ratio solvent of extraction/starting material is 53. A sample of the oil before and after the reduction of agricultural residues (ARs) was analyzed. Results are shown in the following table:

TABLE 8

Agricultural residues (AR's) in lemon essential oil

|  | Before the process | After the process |
| --- | --- | --- |
| Bromopropylate | 0.13 mg/Kg | 0.04 mg/Kg |
| Chlorpyrifos | 0.51 mg/Kg | 0.37 mg/Kg |
| Dicofol | 4.80 mg/Kg | 0.12 mg/Kg |
| Imazalil | 1.75 mg/Kg | <0.01 mg/Kg |
| Orthophenylphenol | 4.54 mg/Kg | 0.97 mg/Kg |
| Pirimetranil | 11.0 mg/Kg | 1.10 mg/Kg |
| Pyriproxyfen | 27.33 mg/Kg | 0.34 mg/Kg |
| TOTAL PCBs | 50.06 mg/Kg | 2.94 mg/Kg |

As shown in Table 8, the process of the invention allows reducing the content of agricultural residues (ARs) by 95% in the starting material in only one supercritical extraction step.

To a person well versed in the subject, it is obvious that this process can be used with the same effectiveness with other oils of animal or vegetable origin to reduce cholesterol with the same effect.

The invention claimed is:

1. A process to eliminate or reduce a pollutant in a starting material without addition of any fluid to the starting material before the process, wherein the starting material is a compound selected from the group consisting of ethyl esters of oils, fats, its derivatives and mixtures thereof, either of animal, krill, algae or microbial origin or biofuels, or of vegetable origin characterized in that process comprises at least one step of extraction, chromatography, distillation, or a combination thereof.

2. The process according to claim 1, wherein the distillation technique is at least one of molecular distillation, short path distillation, thin-film distillation, short path evaporation and thin-film evaporation.

3. The process according to claim 2, wherein the distillation technique is short path distillation.

4. The process according to claim 1, wherein the chromatography technique is a fluid chromatography.

5. The process according to claim 4, wherein the chromatography technique is a supercritical fluid chromatography.

6. The process according to claim 1, wherein the ratio of mobile phase to starting material is about 225 to 950.

7. The process according to claim 1, wherein the chromatography is carried out at temperatures in the interval of 32° C. to 70° C.

8. The process according to claim 1, wherein the chromatography is carried out at pressures in the interval of 7.5 MPa to 30 MPa.

9. The process according to claim 1, wherein the extraction technique is a fluid extraction.

10. The process according to claim 9, wherein the extraction technique is a supercritical fluid extraction.

11. The process according to claim 9, wherein a modifier is added to the extraction solvent used in the extraction technique, said modifier being at least one of alcohol, hydrocarbon and mixtures thereof.

12. The process according to claim 1, wherein the ratio of extraction solvent to starting material is about 10 to 75.

13. The process according to claim 1, wherein the extraction step is carried out at temperatures in the interval of 32° C. and 70° C.

14. The process according to claim 1, wherein the extraction is carried out at a pressures in the interval of 7.5 MPa to 30 MPa.

15. The process according to claim 1, wherein the content of cholesterol in the starting material is reduced to less than 25 mg/g.

16. The process according to claim 1, wherein the content of PCBs measured as the total concentration of PCBs is reduced to less than 150 μg/kg.

17. The process according to claim 1, wherein the content of dioxins is reduced to less than 150 μg/kg.

18. The process according to claim 1, wherein the content of dioxins, measured as the total concentration of PCDD's and PCDF's is reduced to less than 23 pg/g (TE/WHO).

19. The process according to claim 1, wherein the content of agricultural residues (AR's) is reduced to less than 100 ppm.

20. The process according to claim 4, wherein a modifier is added to a mobile phase used in the chromatography technique.

* * * * *